May 26, 1953 C. L. CALOSI 2,640,176
DUPLICATOR SPEED CONTROLS
Filed March 14, 1951
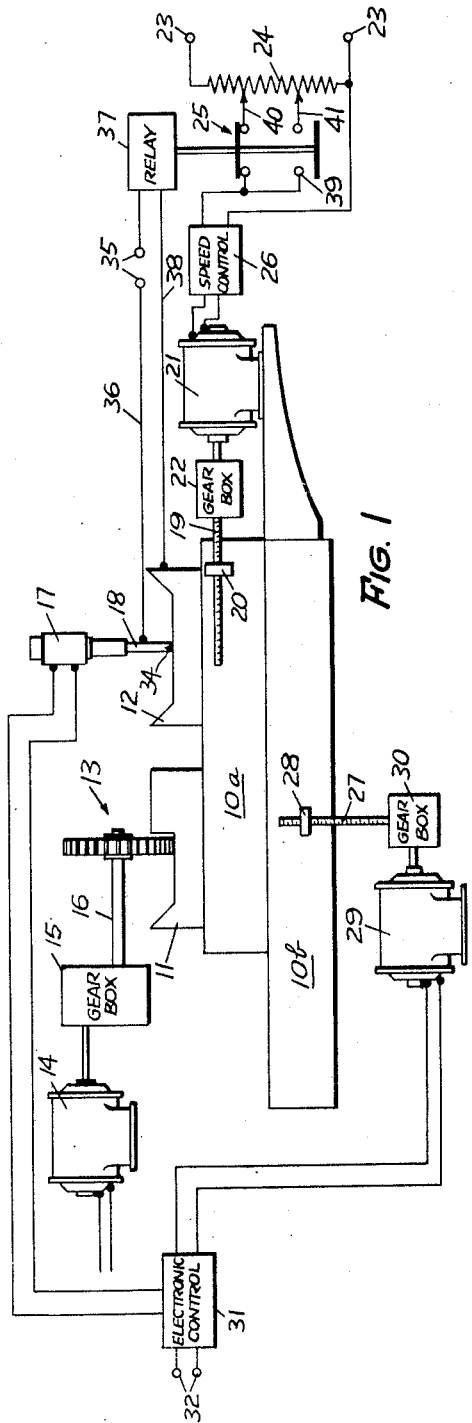
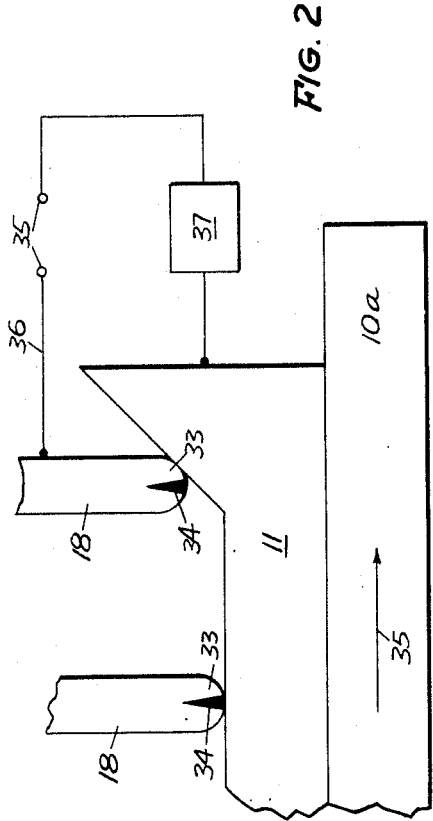
INVENTOR
CARLO L. CALOSI
BY Elmer J. Gorn
ATTORNEY Patented May 26, 1953

2,640,176

UNITED STATES PATENT OFFICE 2,640,176

DUPLICATOR SPEED CONTROL

Carlo L. Calosi, Cambridge, Mass., assignor to Raytheon Manufacturing Company, Newton, Mass., a corporation of Delaware Application March 14, 1951, Serial No. 215,478

6 Claims. (Cl. 318—162)

This invention relates to automatic speed control of duplicators.

In the type of duplicator where a sensing stylus is driven along a contour of the model by a motor driven feed and generates signals in response to changes in the contour that cause the sensing head to follow the contour and move the cutting tool parallel to it along the work, it is found that for best results the speed of the feed along the contour must be reduced when the sensing and cutting heads meet a slope in the contour. It is desirable to have this feed speed change automatic.

To do this it is necessary to have a device to detect when the contour of the model deviates from a line parallel to the path of the feed. The stylus of a sensing device, such as that disclosed in the Patent No. 2,470,244 to Robert A. Fryklund, may be modified by inserting a piece of insulating material at the tip of the stylus of conducting material. This stylus forms with the model part of a circuit for a current responsive device utilized to control the speed of feed of the duplicator along a contour of the model and the work. It will be apparent that with the tip of the stylus insulated there will be no current through this circuit when the tip only contacts the model, as when the contour being followed is parallel to the line of feed and the axis of the stylus is at right angles to this part of the contour. However, when the uninsulated side of the stylus contacts the model, as when the contour makes an apprecaible angle to the path of feed, the circuit is completed and the current responsive device operated to readjust the speed of the feed, preferably by a speed control circuit, such as that disclosed in Howard A. Satterlee's United States Patent No. 2,163,632, to maintain the feed drive motor at one of two constant speeds while the motor is subjected to a varying load.

The result is that the speed of the feed of the duplicator along the contour of the model is maintained at one speed when the stylus is at a portion of the contour that is substantially parallel to the feed path, and at another slower speed when the stylus is at a portion of the contour that makes a substantial angle to the feed path of the stylus.

The foregoing and other advantages, objects and features of the invention will be better understood from the following description taken in conjunction with the accompanying drawings, wherein:

Fig. 1 is a schematic diagram of one form of the duplicator system embodying the invention; and Fig. 2 is a schematic diagram of a stylus tip in contact with two portions of the model.

In Fig. 1, the numerals 10a and 10b represent the two parts of the work table adapted to support the work 11 and model 12. The milling or other tool 13 is mounted in contact with the work 11 and is driven by the motor 14 through the gear box 15 and the shafting 16. The model 12 is also mounted on the work table 10a. A sensing unit 17, which is preferably of the type disclosed in the cited patent to Fryklund, follows the contour of the model 12 as it travels past a stylus 18 that drives the sensing coils in the sensing unit 17.

The upper portion 10a of the work table is moved by a feed screw 19 working through a threaded block 20 attached to the upper portion of the table 10a along a chosen contour of the model 12. The feed screw 19 is driven by a motor 21 through a gear box 22. The motor 21 receives its power from a source 23 through a potentiometer 24, relay contacts 25, and speed control circuit 26 of the type disclosed in the cited patent to Satterlee, or any other convenient circuit that will maintain the motor 21 at a constant speed under varying load conditions.

The work 11 is fed up into the milling tool 13, and the model 12 up into contact with the stylus 18 of the sensing head 17 by a feed screw 27 passing through a threaded block 28 attached to the lower portion 10a of the work table. This screw 27 is driven by a motor 29 through a gear box 30. The motor 29 receives its power from an electronic control circuit 31. This control circuit determines the amount and polarity of the power from a source 32 that is fed to the motor 29 in accordance with signals derived from the sensing head 17. This control circuit is described in the cited patents to Fryklund and Satterlee and will not be further described here as it forms no part of the present invention. In response to signals derived by the sensing head 17 from changes in the control of the model 12 being traced by the stylus 18, the feed drive motor 29 is started and stopped and reversed in a direction to maintain the stylus 18 in contact with the model 12 and assure that the milling tool 13 will follow the contour of the model 12 in cutting the work 11.

As pointed out above, when the milling tool 13 reaches a portion of the control where it deviates from the horizontal travel of the table 10a, the horizontal travel must be slowed to prevent overloading the cutting motor 14 and jumping the machine. How this is done can best be seen from Fig. 2. The stylus 18 is formed with a rounded tip 33 of conducting material, such as metal, with an insert 34 of insulating material, such as plastic. This insert is large enough to cover the area of the tip 33 that would be in contact with the model 12 when its contour is substantially parallel to the path of horizontal feed travel. This insert area is, however, small enough to leave exposed the portion of the conducting material of the tip 33 that lies in an area that will come into contact with the model only when the contour of the model 12 varies sufficiently from a line parallel to the direction of feed, as indicated by the arrow 35, to require slowing the rate of feed to the table 10a along the contour. The sharper the tip 33 of the stylus 18 and the smaller the insulated area of the insert 34, the greater must be the deviation of the contour from the line parallel to the path of the feed before the model 12 contacts the conducting portions of the stylus 18.

The stylus 18 is connected to one terminal of a source of potential 35 by wire 36. The other terminal of the source 35 is connected to a terminal of the coil 37 of a relay. The other terminal of this relay 37 is connected to the model 12 by a wire 38.

When the contour of the model 12 is parallel to the feed path, the insulated insert 34 contacts the model 12 and the circuit just described is pending so that the coil of the relay is not energized. When the stylus reaches a portion of the contour where the conductive material of the stylus 18 contacts the model 12, as at the right-hand position shown in Fig. 2, the circuit just described is completed and the coil 37 of the relay energized.

This operates the relay that has two sets of contacts 25 and 39. The normally closed set of contacts 25 connects an arm 40 on the potentiometer 24 across the power supply 23 to the speed control circuit 26 for the feed drive motor 21. The normally open set of contacts 39 connects a second arm 41 on the potentiometer 24 to the speed control circuit 26. The arm 40 applies a higher potential to the speed control circuit 26 when its associated contacts 25 are closed and so permits the motor 21 to turn faster as desired when the contour is relatively flat. The arm 41 on the potentiometer 24 applies a lower potential to the speed control 26 when the contacts 39 are closed on energization of the relay coil 37. The effect of this lower voltage is to slow down the motor 21 as desired when the slope of the contour increases.

It is apparent that the stylus tip 33 can be of many shapes. The important point is that the insulated area of the tip 34 be no larger than necessary to contact those portions of the model 12 where its contour gradient is sufficiently slight to permit maximum speed of feed along the contour. In order to carry out the invention, the surface of the stylus, except for the insulated portion 34 at the tip, must be capable of conducting electricity. The surface of the model 12 must also be capable of conducting electricity. The stylus tip must be isolated electrically from the model so that there can be no path for current to flow from the model to the conducting portions of the stylus, except when they are in contact due to the slope of the contour.

The speed control circuit for the motor need not be of the type as described in the cited patent to Satterlee. Any type of control circuit that determines the speed of a motor by the amount of control voltage applied will serve the purpose. The sensing head, and the circuits it controls, also need not be of the type described in the cited patent to Fryklund, but can be any type of sensing device and circuit that will permit a stylus to follow a contour of a model, and guide a tool along the same contour.

The two-arm potentiometer 24 could be replaced by a fixed voltage divider circuit, or by separate power supplies, one for each desired voltage, or other obvious expedients.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a duplicator system, a model having a conductive surface to be duplicated, a stylus, means to cause relative motion of the model and the stylus at a predetermined speed while keeping the stylus in contact with the surface of the model, a control circuit comprising a source of potential, the stylus, the surface of the model and a control device connected in series, said circuit being adapted to be completed when the gradient of the contour of the model makes a substantial angle to the path of relative motion of the stylus and the model, and means under control of said control device to slow the relative motion of the stylus and the model.

2. In a duplicator system, a model having a conductive surface to be duplicated, a stylus of conductive material with a tip electrically isolated from the remainder of the stylus and shaped to make contact with a limited area of the surface, means to cause relative motion of the model and the stylus at a predetermined speed while keeping the stylus in contact with the surface of the model, a control circuit comprising a source of potential, the stylus, the surface of the model and a control device connected in series, said circuit being adapted to be closed when the gradient of the contour of the model makes a substantial angle to the path of relative motion of the stylus and the model, and means under control of said control device to slow the relative motion of the stylus and the model.

3. In a duplicator system, a model having a conductive surface to be duplicated, a stylus of conductive material with a tip electrically isolated from the remainder of the stylus and shaped to make contact with a limited area of the surface, means to cause relative motion of the model and the stylus at a predetermined speed while keeping the stylus in contact with the surface of the model, a control circuit comprising a source of potential, the stylus, the surface of the model and a control device connected in series, said circuit being adapted to be closed when the gradient of the contour of the model makes a substantial angle to the path of relative motion of the stylus and the model, and means under control of said control device to slow the relative motion of the stylus and the model, said slowing means comprising means for 4. A slope-detecting device comprising a conductive surface, a stylus of conductive material with a tip electrically isolated from the remainder of the stylus and shaped to make contact with a limited area of the surface, a circuit comprising a source of potential, the stylus, the conductive surface and a control device connected in series, said circuit being adapted to be completed to operate the control device when a portion of the stylus, other than the isolated tip, contacts the conductive surface.

5. A slope-detecting device comprising a conductive surface, a stylus of conductive material with a tip electrically isolated from the remainder of the stylus and shaped to make contact with a limited area of the surface, means to produce relative motion of the stylus and the surface, a circuit comprising a source of potential, the stylus, the conductive surface and a control device connected in series, said circuit being adapted to be completed to operate the control device when a portion of the stylus, other than the isolated tip, contacts the conductive surface, means limiting the energy supplied to the relative motion means.

under control of the control device to reduce the speed of the relative motion-producing means when said control device is operated.

6. A slope-detecting device comprising a conductive surface, a stylus of conductive material with a tip electrically isolated from the remainder of the stylus and shaped to make contact with a limited area of the surface, electrical motor means to produce relative motion of the stylus and the surface, a circuit comprising a source of potential, the stylus, the conductive surface and a control device connected in series, said circuit being adapted to be completed to operate the control device when a portion of the stylus, other than the isolated tip, contacts the conductive surface.

CARLO L. CALOSI.

References Cited in the file of this patent

UNITED STATES PATENTS

| Number | Name | Date |
|---|---|---|
| 2,116,593 | Bouvier et al. | May 10, 1938 |
| 2,413,274 | Wilkie et al. | Dec. 24, 1946 |
| 2,423,208 | Sinnett | July 1, 1947 |